US012767758B2

(12) United States Patent
Jung et al.

(10) Patent No.: US 12,767,758 B2
(45) Date of Patent: Oct. 20, 2026

(54) RESIN AND METHOD FOR PRODUCING SAME

(71) Applicant: LG Chem, Ltd., Seoul (KR)

(72) Inventors: Min Suk Jung, Daejeon (KR); Jaesoon Bae, Daejeon (KR); Hyeonah Shin, Daejeon (KR); Kyeongmun Kim, Daejeon (KR); Kyeongmin Kim, Daejeon (KR); Bora Shin, Daejeon (KR)

(73) Assignee: LG Chem, Ltd., Seoul (KR)

(*) Notice: Subject to any disclaimer, the term of this patent is extended or adjusted under 35 U.S.C. 154(b) by 759 days.

(21) Appl. No.: 18/020,528

(22) PCT Filed: May 16, 2022

(86) PCT No.: PCT/KR2022/006984
§ 371 (c)(1),
(2) Date: Feb. 9, 2023

(87) PCT Pub. No.: WO2022/245077
PCT Pub. Date: Nov. 24, 2022

(65) Prior Publication Data

US 2023/0295372 A1 Sep. 21, 2023

(30) Foreign Application Priority Data

May 17, 2021 (KR) ........................ 10-2021-0063567

(51) Int. Cl.
*C08G 63/688* (2006.01)
*C08G 63/672* (2006.01)

(52) U.S. Cl.
CPC ....... *C08G 63/6886* (2013.01); *C08G 63/672* (2013.01)

(58) Field of Classification Search
CPC .... C08G 73/677; C08G 73/206; C09D 11/33; C09D 11/102; C09D 11/52
See application file for complete search history.

(56) References Cited

U.S. PATENT DOCUMENTS

2020/0354299 A1 11/2020 Reuter et al.

FOREIGN PATENT DOCUMENTS

| | | |
|---|---|---|
| JP | 2010-209054 A | 9/2010 |
| JP | 2015-021055 A | 2/2015 |
| KR | 2020-0043404 A | 4/2020 |

OTHER PUBLICATIONS

International Search Report for PCT/KR2022/006984 mailed Sep. 1, 2022. 3 pgs.
Thiemann, F. et al. Synthesis of enantiomerically pure dissymmetric 2,2' -disubstituted 9,9' -spirobifluorenes. Eur. J. Org. Chem. May 2005, pp. 1991-2001.See abstract; and formula 7.
Charas, A. et al. Stimulated emission and ultrafast optical switching in a ter(9,9' -spirobifluorene)-co-methylmethacrylate copolymer. Journal of polymer science part B: polymer physics. 2011, vol. 49, No. 1, pp. 52-61. (Oct. 2010) See abstract; and formula 1.

*Primary Examiner* — Shane Fang
(74) *Attorney, Agent, or Firm* — Lerner David LLP

(57) ABSTRACT

The present application relates to a resin including a unit represented by Chemical Formula 1, a method for preparing the same, a resin composition including the same, and a molded article including the resin composition,

[Chemical Formula 1]

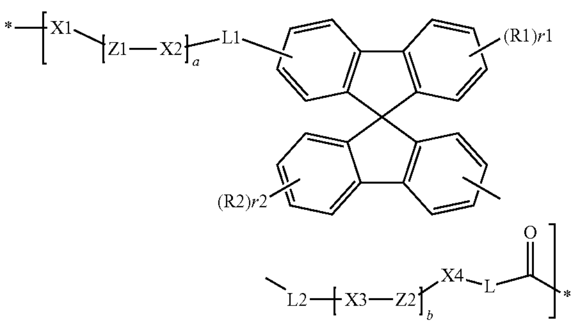

in Chemical Formula 1, R1, R2, r1, r2, L1, L2, L, X1 to X4, Z1, Z2, a and b are described herein.

18 Claims, No Drawings

RESIN AND METHOD FOR PRODUCING SAME

CROSS-REFERENCE TO RELATED APPLICATIONS

The present application is a national stage entry under 35 U.S.C. § 371 of International Application No. PCT/KR2022/006984 filed on May 16, 2022, which claims priority from Korean Patent Application No. 10-2021-0063567 filed on May 17, 2021, all the disclosures of which are incorporated herein by reference.

TECHNICAL FIELD

The present invention relates to a resin and a method for preparing the same. More specifically, the present invention relates to a resin having a high refractive index and high transparency, and a method for preparing the same.

BACKGROUND ART

The higher the refractive index of an optical material, the thinner the optical lens required to achieve the same level of correction. Accordingly, as the refractive index of the optical material is increased, a thinner and lighter lens can be manufactured, so that it is possible to make various devices, where lenses are used, smaller.

Generally, when the refractive index of an optical material is increased, there is a problem in that the Abbe's Number becomes low, and for use as an optical material, a certain level or higher of transparency is required.

DETAILED DESCRIPTION OF THE INVENTION

Technical Problem

An exemplary embodiment of the present invention has been made in an effort to provide a resin having a novel structure and a method for preparing the same.

Another exemplary embodiment of the present invention has been made in an effort to provide a composition including a resin having a novel structure and a molded article prepared from the composition.

Technical Solution

An exemplary embodiment of the present invention provides a resin including a unit represented by the following Chemical Formula 1.

[Chemical Formula 1]

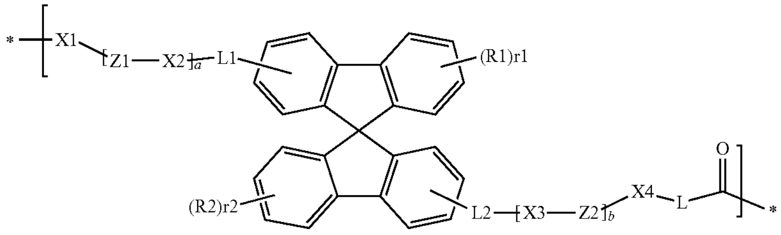

In Chemical Formula 1,

R1 and R2 are the same as or different from each other, and are each independently a substituted or unsubstituted alkyl group; or a substituted or unsubstituted cycloalkyl group, r1 is an integer from 0 to 4, and when r1 is 2 or higher, two or more R1's are the same as or different from each other, r2 is an integer from 0 to 4, and when r2 is 2 or higher, two or more R2's are the same as or different from each other, L1 and L2 are the same as or different from each other, and are each independently a substituted or unsubstituted arylene group; or a substituted or unsubstituted heteroarylene group, L is a direct bond; or —CO-L'-, L' is a substituted or unsubstituted arylene group, X1 to X4 are the same as or different from each other, and are each independently O; or S, Z1 and Z2 are the same as or different from each other, and are each independently a substituted or unsubstituted alkylene group; or a substituted or unsubstituted cycloalkylene group, a and b are the same as or different from each other, and are each independently an integer from 1 to 10, and when a and b are each 2 or higher, structures in each parenthesis are the same as or different from each other, and

* means a moiety linked to the main chain of the resin.

An exemplary embodiment of the present invention provides a compound represented by the following Chemical Formula 1a.

[Chemical Formula 1a]

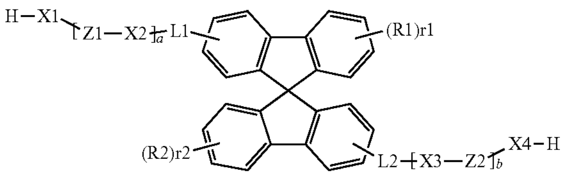

In Chemical Formula 1a,

R1 and R2 are the same as or different from each other, and are each independently a substituted or unsubstituted alkyl group; or a substituted or unsubstituted cycloalkyl group, r1 is an integer from 0 to 4, and when r1 is 2 or higher, two or more R1's are the same as or different from each other, r2 is an integer from 0 to 4, and when r2 is 2 or higher, two or more R2's are the same as or different from each other, L1 and L2 are the same as or different from each other, and are each independently a substituted or unsubstituted arylene group; or a substituted or unsubstituted heteroarylene group, X1 to X4 are the same as or different from each other, and are each independently O; or S, Z1 and Z2 are the same as or different from each other, and are each independently a substituted or unsubstituted alkylene group; or a substituted or unsubstituted cycloalkylene group, and a and b are the same as or different from each other, and are each independently an integer from 1 to 10, and when a and b are each 2 or higher, structures in each parenthesis are the same as or different from each other.

An exemplary embodiment of the present invention provides a method for preparing the resin, the method including: polymerizing a composition for preparing a resin, which includes a compound represented by the following Chemical Formula 1a; and a polyester precursor or a polycarbonate precursor.

[Chemical Formula 1a]

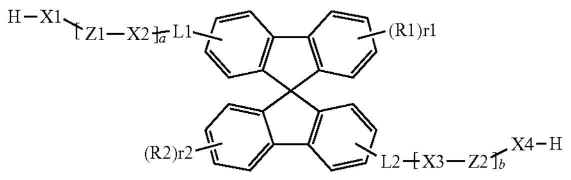

In Chemical Formula 1a, the definitions of R1, R2, r1, r2, L1, L2, X1 to X4, Z1, Z2, a and b are the same as the definitions in Chemical Formula 1.

Another exemplary embodiment of the present invention provides a resin composition including the resin according to the above-described exemplary embodiment.

Still another exemplary embodiment of the present invention provides a molded article including the resin composition according to the above-described exemplary embodiment.

Advantageous Effects

The resin according to the exemplary embodiments of the present invention has a high refractive index and high transparency.

By using the resin according to the exemplary embodiments of the present invention, an excellent optical lens can be obtained.

BEST MODE

Hereinafter, specific exemplary embodiments will be described in more detail.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present invention, the term "substituted or unsubstituted" means being substituted with one or more substituents selected from the group consisting of a halogen group; a nitro group ($NO_2$); a nitrile group (CN); an alkyl group; a cycloalkyl group; an aryl group; and a heteroaryl group, or being substituted with a substituent to which two or more substituents among the exemplified substituents are linked, or having no substituent.

In the present specification, * means a binding moiety to another structure.

In the present specification, a cycloalkylene group may be a monocyclic or polycyclic cycloalkylene group. Specifically, the cycloalkylene group may be a cycloalkylene group having 3 to 20 carbon atoms; a monocyclic or polycyclic cycloalkylene group having 6 to 18 carbon atoms; or a monocyclic or polycyclic cycloalkylene group having 6 to 12 carbon atoms. More specifically, the cycloalkylene group may be a divalent group derived from an alicyclic hydrocarbon such as a cyclopentylene group, a cyclohexylene group, or a cycloheptylene group, and the like as the monocyclic cycloalkylene, and may be a divalent adamantane-diyl group, a divalent norbonane-diyl group, and the like as the polycyclic cycloalkylene group. However, the cycloalkylene group is not limited thereto. Further, the cycloalkylene group may be unsubstituted or substituted one or more times with an alkyl group having 1 to 10 carbon atoms, an alkoxy group having 1 to 10 carbon atoms, or a halogen group.

In the present specification, the description on the cycloalkylene group may be applied, except that cycloalkyl group is a monovalent group rather than a divalent group.

In the present specification, an alkylene group may be a straight-chained or branched alkylene group as a divalent group derived from an aliphatic hydrocarbon having 1 to 30, 1 to 20, 1 to 10, or 1 to 5 carbon atoms. Specific examples of the alkylene group include a methylene group, an ethylene group, a propylene group, an n-propylene group, an isopropylene group, a butylene group, an n-butylene group, an isobutylene group, a tert-butylene group, a sec-butylene group, a 1-methyl-butylene group, a 1-ethyl-butylene group, a pentylene group, an n-pentylene group, an isopentylene group, a neopentylene group, a tert-pentylene group, a hexylene group, an n-hexylene group, a 1-methylpentylene group, a 2-methylpentylene group, a 4-methyl-2-pentylene group, a 3,3-dimethylbutylene group, a 2-ethylbutylene group, a heptylene group, an n-heptylene group, a 1-methylhexylene group, an octylene group, an n-octylene group, a tert-octylene group, a 1-methylheptylene group, a 2-ethylhexylene group, a 2-propylpentylene group, an n-nonylene group, a 2,2-dimethylheptylene group, a 1-ethyl-propylene group, a 1,1-dimethyl-propylene group, an isohexylene group, a 2-methylpentylene group, a 4-methylhexylene group, a 5-methylhexylene group, and the like, but are not limited thereto.

In the present specification, the description on the alkylene group may be applied, except that the alkyl group is a monovalent group rather than a divalent group.

In the present specification, the alkyl group includes a straight-chained alkyl group, a branched alkyl group, and a cycloalkyl group, unless otherwise limited.

In the present specification, an arylene group may be a monocyclic or polycyclic arylene group, and the number of carbon atoms thereof is not particularly limited, but is preferably 6 to 30, and may be 6 to 20. Specific examples of the monocyclic arylene group include a phenylene group, a biphenylylene group, a terphenylylene group, and the like, but are not limited thereto. When the arylene group is a polycyclic arylene group, the number of carbon atoms thereof is not particularly limited, but is preferably 10 to 30, and may be 10 to 20. Specific examples of the polycyclic arylene group include a naphthylene group, a divalent anthracene group, a divalent phenanthrene group, a divalent triphenylene group, a divalent pyrene group, a divalent perylene group, a divalent chrysene group, a divalent fluorene group, and the like, but are not limited thereto.

In the present specification, the description on the arylene group may be applied, except that the aryl group is a monovalent group rather than a divalent group.

In the present specification, a heteroaryl group includes one or more atoms other than carbon, that is, one or more heteroatoms, and specifically, the heteroatom includes one or more atoms selected from the group consisting of O, N, Se, S, and the like. The number of carbon atoms of the heteroaryl group is not particularly limited, but is preferably 1 to 30, and may be 1 to 20. The heteroaryl group may be monocyclic or polycyclic. Examples of the heteroaryl group include a thiophene group, a furan group, a dibenzofuran group, a dibenzothiophene group, a benzothiophene group, a pyrrole group, an imidazole group, a thiazole group, an oxazole group, an oxadiazole group, a pyridine group, a bipyridine group, a pyrimidine group, a triazine group, a triazole group, an acridine group, a pyridazine group, a pyrazine group, a quinoline group, a quinazoline group, a quinoxaline group, a phthalazine group, a pyridopyrimidine group, a pyridopyrazine group, a pyrazinopyrazine group, an isoquinoline group, an indole group, a carbazole group, and the like, but are not limited thereto.

In the present specification, the description on the heteroaryl group may be applied, except that the heteroarylene group is a divalent group rather than a monovalent group.

In the present specification, a halogen group is a fluoro group, a chloro group, a bromo group, or an iodo group.

In the present specification, the divalent aliphatic hydrocarbon group means the above-described alkylene group, cycloalkylene group, and the like.

In the present specification, the description on the above-described cycloalkylene group may be applied to an aliphatic ring, and the description on the arylene group or heteroarylene group may be applied to an aromatic ring.

An exemplary embodiment of the present invention provides a resin including a unit represented by the following Chemical Formula 1.

r2 is an integer from 0 to 4, and when r2 is 2 or higher, two or more R2's are the same as or different from each other, L1 and L2 are the same as or different from each other, and are each independently a substituted or unsubstituted arylene group; or a substituted or unsubstituted heteroarylene group, L is a direct bond; or —CO-L'-, L' is a substituted or unsubstituted arylene group, X1 to X4 are the same as or different from each other, and are each independently O; or S, Z1 and Z2 are the same as or different from each other, and are each independently a substituted or unsubstituted alkylene group; or a substituted or unsubstituted cycloalkylene group, a and b are the same as or different from each other, and are each independently an integer from 1 to 10, and when a and b are each 2 or higher, structures in each parenthesis are the same as or different from each other, and

* means a moiety linked to the main chain of the resin.

From the relationship form between the molecular structure and the refractive index, which is known by the Lorentz-Lorenz's formula, it can be seen that the refractive index of a material composed of molecules is increased by increasing the electron density of the molecule and reducing the molecular volume.

A resin including the unit represented by Chemical Formula 1 may increase packability by including spirobifluorene which is a core structure of Chemical Formula 1, and L1 and L2 may be a substituted or unsubstituted arylene group or a substituted or unsubstituted heteroarylene group to increase the electron density of spirobifluorene which is the core structure of Chemical Formula 1, thereby improving the refractive index of the resin.

When R1 and R2 are further substituted with an aromatic substituent such as an aryl group or a heteroaryl group in addition to L1 and L2, a thermosetting resin may be prepared instead of a thermoplastic resin, which is not preferred as a resin to be provided in the present invention.

In an exemplary embodiment of the present invention, R1 and R2 are the same as or different from each other, and are each independently a substituted or unsubstituted alkyl group having 1 to 30 carbon atoms; or a substituted or unsubstituted cycloalkyl group having 3 to 30 carbon atoms.

[Chemical Formula 1]

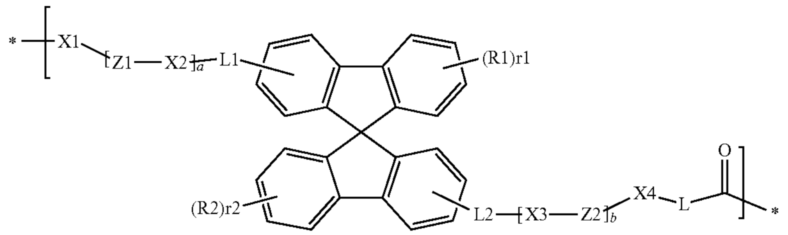

In Chemical Formula 1,

R1 and R2 are the same as or different from each other, and are each independently a substituted or unsubstituted alkyl group; or a substituted or unsubstituted cycloalkyl group, r1 is an integer from 0 to 4, and when r1 is 2 or higher, two or more R1's are the same as or different from each other, In an exemplary embodiment of the present invention, R1 and R2 are the same as or different from each other, and are each independently a substituted or unsubstituted alkyl group having 1 to 20 carbon atoms; or a substituted or unsubstituted cycloalkyl group having 3 to 20 carbon atoms.

In an exemplary embodiment of the present invention, R1 and R2 are the same as or different from each other, and are each independently a substituted or unsubstituted alkyl group having 1 to 10 carbon atoms; or a substituted or unsubstituted cycloalkyl group having 3 to 10 carbon atoms.

In an exemplary embodiment of the present invention, r1 and r1 are an integer of 0.

In an exemplary embodiment of the present invention, L1 and L2 are the same as or different from each other, and are each independently a substituted or unsubstituted arylene group having 6 to 30 carbon atoms; or a substituted or unsubstituted heteroarylene group having 3 to 30 carbon atoms.

In an exemplary embodiment of the present invention, L1 and L2 are the same as or different from each other, and are each independently a substituted or unsubstituted arylene group having 6 to 20 carbon atoms; or a substituted or unsubstituted heteroarylene group having 4 to 20 carbon atoms.

In an exemplary embodiment of the present invention, L1 and L2 are the same as or different from each other, and are each independently a substituted or unsubstituted arylene group having 6 to 20 carbon atoms; or a substituted or unsubstituted heteroarylene group having 3 to 20 carbon atoms.

In an exemplary embodiment of the present invention, L1 and L2 are the same as or different from each other, and are each independently a substituted or unsubstituted arylene group having 6 to 12 carbon atoms; or a substituted or unsubstituted heteroarylene group having 3 to 10 carbon atoms.

In an exemplary embodiment of the present invention, L1 and L2 are the same as or different from each other, and are each independently a substituted or unsubstituted phenylene group; a substituted or unsubstituted biphenylylene group; a substituted or unsubstituted naphthylene group; a substituted or unsubstituted divalent dibenzofuran group; a substituted or unsubstituted divalent fluorene group; or a substituted or unsubstituted divalent thiophenyl group.

In an exemplary embodiment of the present invention, L1 and L2 are the same as or different from each other, and are each independently a phenylene group; a biphenylylene group; a naphthylene group; a divalent dibenzofuran group; a divalent dimethylfluorene group; or a divalent thiophenyl group.

In an exemplary embodiment of the present invention, L1 and L2 are the same as or different from each other, and are each independently a phenylene group; a naphthylene group; or a divalent dibenzofuran group.

In an exemplary embodiment of the present invention, L is a direct bond.

In an exemplary embodiment of the present invention, L is —CO-L'-.

In an exemplary embodiment of the present invention, L' is a substituted or unsubstituted arylene group having 6 to 30 carbon atoms.

In an exemplary embodiment of the present invention, L' is a substituted or unsubstituted arylene group having 6 to 20 carbon atoms.

In an exemplary embodiment of the present invention, L' is a substituted or unsubstituted arylene group having 6 to 12 carbon atoms.

In an exemplary embodiment of the present invention, L' is a substituted or unsubstituted phenylene group.

In an exemplary embodiment of the present invention, L' is a phenylene group.

In an exemplary embodiment of the present invention, X1 to X4 are 0.

In an exemplary embodiment of the present invention, X1 to X4 are S.

In an exemplary embodiment of the present invention, Z1 and Z2 are the same as or different from each other, and are each independently a substituted or unsubstituted alkylene group having 1 to 30 carbon atoms; or a substituted or unsubstituted cycloalkylene group having 3 to 30 carbon atoms.

In an exemplary embodiment of the present invention, Z1 and Z2 are the same as or different from each other, and are each independently a substituted or unsubstituted alkylene group having 1 to 20 carbon atoms; or a substituted or unsubstituted cycloalkylene group having 3 to 20 carbon atoms.

In an exemplary embodiment of the present invention, Z1 and Z2 are the same as or different from each other, and are each independently a substituted or unsubstituted alkylene group having 1 to 10 carbon atoms; or a substituted or unsubstituted cycloalkylene group having 3 to 10 carbon atoms.

In an exemplary embodiment of the present invention, Z1 and Z2 are the same as or different from each other, and are each independently a substituted or unsubstituted alkylene group having 1 to 10 carbon atoms.

In an exemplary embodiment of the present invention, Z1 and L2 are the same as or different from each other, and are each independently a substituted or unsubstituted methylene group; a substituted or unsubstituted ethylene group; a substituted or unsubstituted propylene group; or a substituted or unsubstituted hexylene group.

In an exemplary embodiment of the present invention, Z1 and Z2 are the same as or different from each other, and are each independently a methylene group; an ethylene group; a propylene group; or a hexylene group.

In an exemplary embodiment of the present invention, Z1 and Z2 are an ethylene group.

In the present invention, Chemical Formula 1 may be represented by the following Chemical Formula 1-1.

[Chemical Formula 1-1]

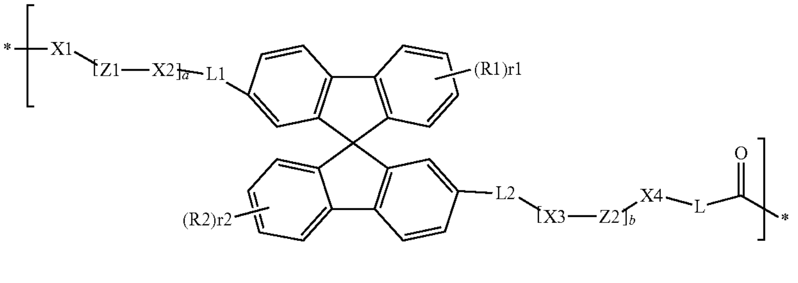

In Chemical Formula 1-1, the definition of each substituent is the same as that in Chemical Formula 1.

According to an exemplary embodiment of the present invention, the resin may have —OH; —SH; —$CO_2CH_3$; or —$OC_6H_5$ as an end group.

In an exemplary embodiment of the present invention, the resin has a weight average molecular weight of 10,000 g/mol to 200,000 g/mol, preferably 15,000 g/mol to 100,000 g/mol or 20,000 g/mol to 50,000 g/mol. The weight average molecular weight is more preferably 25,000 g/mol to 40,000 g/mol or 25,500 g/mol to 27,100 g/mol.

When the resin satisfies the above-described weight average molecular weight range, the resin may have optimum fluidity and processability.

In the present invention, the weight average molecular weights (Mws) of the resin and the oligomer used in the preparation thereof may be measured by gel permeation chromatograph (GPC) using a polystyrene (PS) standard using Agilent 1200 series. Specifically, the weight average molecular weights may be measured using an Agilent 1200 series device using a Polymer Laboratories PLgel MIX-B 300 mm length column, and in this case, the measurement temperature is 40° C., the used solvent is tetrahydrofuran (THF), and the flow rate is 1 mL/min. The sample of the resin or oligomer is each prepared at a concentration of 10 mg/10 mL, and then fed in an amount of 10 μL, and the Mw value is induced using a calibration curve formed using a polystyrene standard. In this case, nine types of polystyrene standard products with a molecular weight (g/mol) of 2,000/10,000/30,000/70,000/200,000/700,000/2,000,000/4,000,000/10,000,000 are used.

In an exemplary embodiment of the present invention, the resin may have a glass transition temperature (Tg) of 200° C. to 250° C. The glass transition temperature may be preferably 205° C. to 240° C., more preferably 208° C. to 236° C. When the resin satisfies the above glass transition temperature range, the glass transition temperature is easily adjusted when a resin composition is prepared by mixing with a resin having excellent heat resistance and injectability and having a glass transition temperature different from the above-described range, so that the physical properties desired in the present invention may be satisfied.

The glass transition temperature (Tg) may be measured by a differential scanning calorimeter (DSC). Specifically, the glass transition temperature may be measured from a graph obtained by heating 5.5 mg to 8.5 mg of the resin sample to 270° C. under a nitrogen atmosphere, then scanning the resin sample while heating the resin sample at a heating rate of 10° C./min during the second heating after cooling.

In an exemplary embodiment of the present invention, a refractive index of the resin, which is measured at a wavelength of 589 nm, is 1.68 to 1.75. The refractive index may be preferably 1.689 to 1.721. When the resin satisfies the above refractive index, a thin and light optical lens can be manufactured when the resin is applied to a molded article such as an optical lens.

In an exemplary embodiment of the present invention, the Abbe's Number of the resin, which is measured and calculated at a wavelength of 589 nm, 486 nm, and 656 nm may be 10 to 20. Preferably, the Abbe's Number may be 12 to 16. More preferably, the Abbe's Number may be 13.1 to 14.3. When the resin satisfies the above Abbe's Number range, there is an effect that the dispersion is decreased and the sharpness is increased when the resin is applied to a molded product such as an optical lens, while maintaining the high refractive index. The Abbe's Number may specifically be obtained by the following Equation by measuring the refractive index ($n_D$, $n_F$, and $n_C$) at a wavelength of D (589 nm), F (486 nm), and C (656 nm), respectively at 20° C.

$$\text{Abbe's Number} = (n_D - 1)/(n_F - n_C)$$

The refractive index and the Abbe's Number may be measured from a film prepared by applying a solution prepared by dissolving the resin in a solvent to a silicon wafer by spin-coating, and may be measured by obtaining the result value according to the wavelength of light using an ellipsometer at 20° C. for the applied film. The solution may be applied by the spin-coating at a rotation speed of 150 rpm to 300 rpm, and the applied film may have a thickness of 5 μm to 20 μm. The silicon wafer is not particularly limited, and any silicon wafer that can measure the refractive index and the Abbe's Number of the resin composition according to the present invention may be appropriately adopted. The solvent may be dimethylacetamide or 1,2-dichlorobenzene, and the solution may be prepared by dissolving the resin sample in an amount of 10 wt % based on the total weight of the solution.

An exemplary embodiment of the present invention provides a compound represented by the following Chemical Formula 1a.

[Chemical Formula 1a]

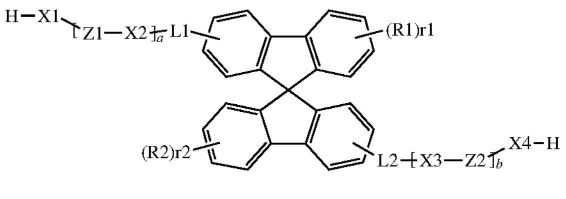

In Chemical Formula 1a,

R1 and R2 are the same as or different from each other, and are each independently a substituted or unsubstituted alkyl group; or a substituted or unsubstituted cycloalkyl group, r1 is an integer from 0 to 4, and when r1 is 2 or higher, two or more R1's are the same as or different from each other, r2 is an integer from 0 to 4, and when r2 is 2 or higher, two or more R2's are the same as or different from each other, L1 and L2 are the same as or different from each other, and are each independently a substituted or unsubstituted arylene group; or a substituted or unsubstituted heteroarylene group, X1 to X4 are the same as or different from each other, and are each independently O; or S, Z1 and Z2 are the same as or different from each other, and are each independently a substituted or unsubstituted alkylene group; or a substituted or unsubstituted cycloalkylene group, and a and b are the same as or different from each other, and are each independently an integer from 1 to 10, and when a and b are each 2 or higher, structures in each parenthesis are the same as or different from each other.

An exemplary embodiment of the present invention provides a method for preparing the resin, the method including: polymerizing a composition for preparing a resin, which includes a compound represented by the following Chemical Formula 1a; and a polyester precursor or a polycarbonate precursor.

[Chemical Formula 1a]

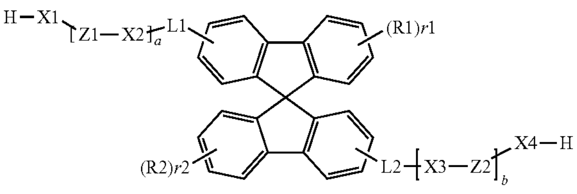

in Chemical Formula 1a, the definitions of R1, R2, r1, r2, L1, L2, X1 to X4, Z1, Z2, a and b are the same as the definitions in Chemical Formula 1.

An exemplary embodiment of the present invention preferably provides a method for preparing a resin, the method including: polymerizing a composition for preparing a resin, which includes the compound represented by Chemical Formula 1a and the polyester precursor.

An exemplary embodiment of the present invention provides a composition for preparing a resin, which includes the compound represented by Chemical Formula 1a; and a polyester precursor or a polycarbonate precursor.

The composition for preparing a resin may further include a solvent.

The solvent may be, for example, diphenyl ether, dimethylacetamide or methanol, but is not limited thereto, and any solvent applied in the art may be appropriately adopted.

The solvent may be included in an amount of 5 parts by weight to 60 parts by weight with respect to 100 parts by weight of the composition for preparing a resin.

The solvent may be included in an amount of preferably 5 parts by weight to 50 parts by weight, 10 parts by weight to 40 parts by weight or 10 parts by weight to 30 parts by weight with respect to 100 parts by weight of the composition for preparing a resin.

In an exemplary embodiment of the present invention, the compound represented by Chemical Formula 1a may be any one of the following compounds, but is not limited thereto.

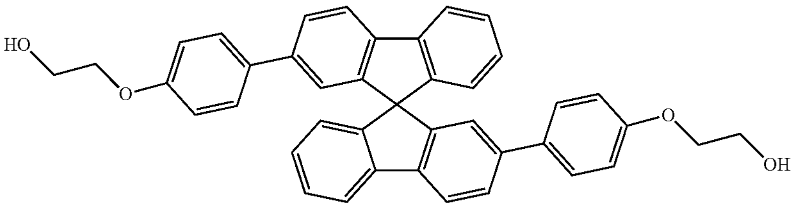

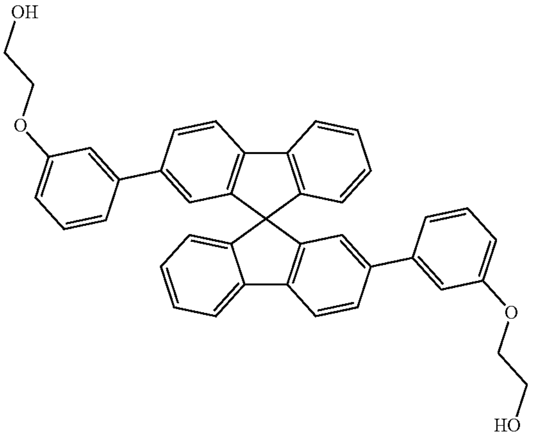

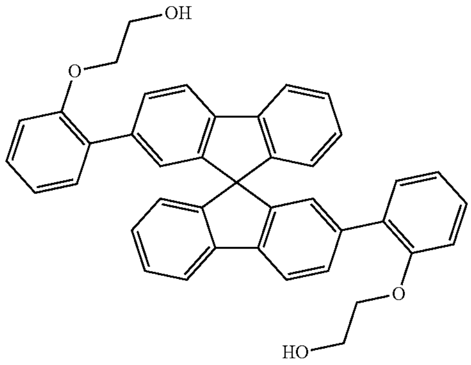

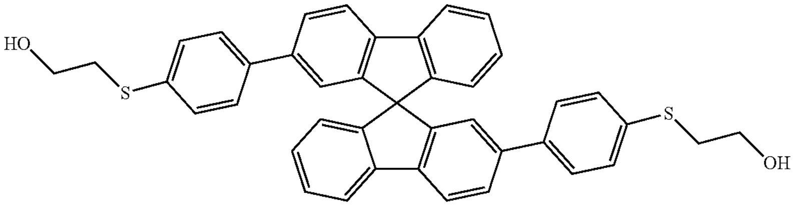

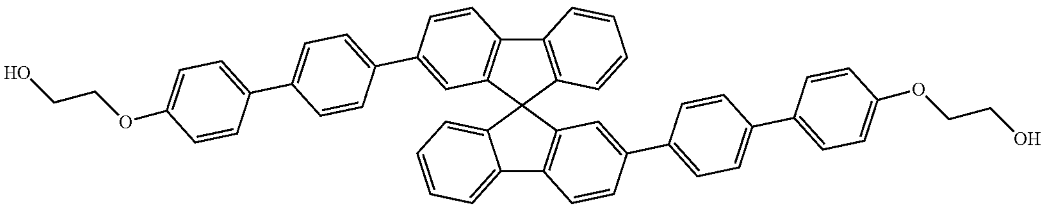

-continued
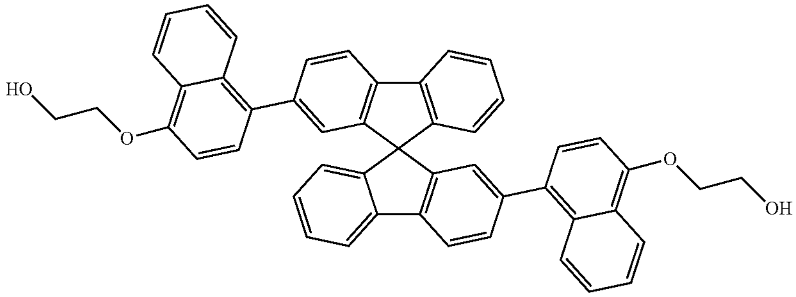
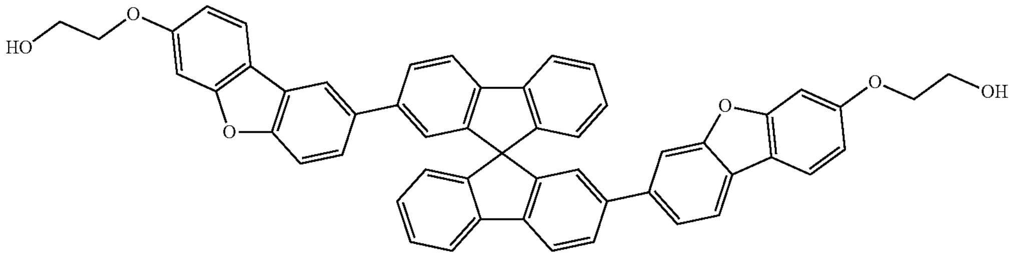
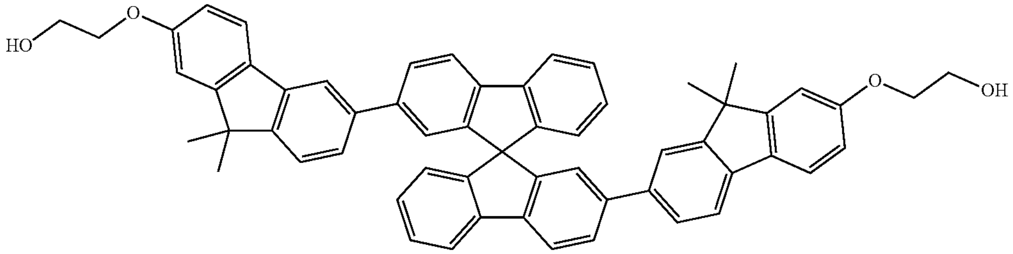
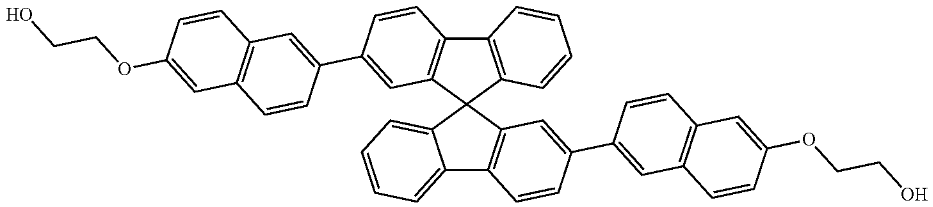
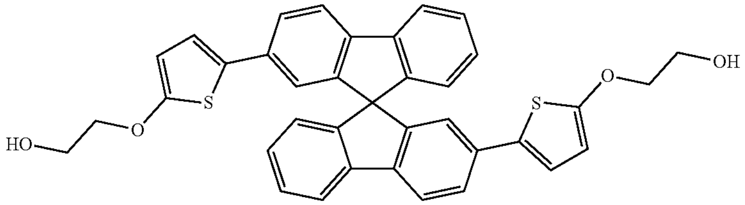
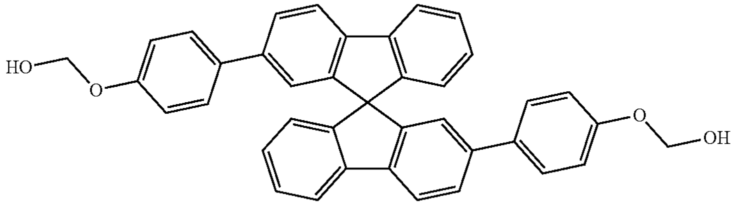
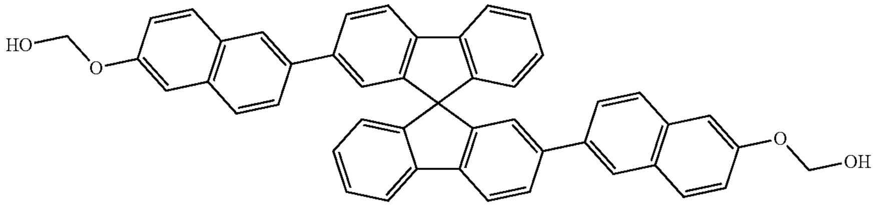

-continued

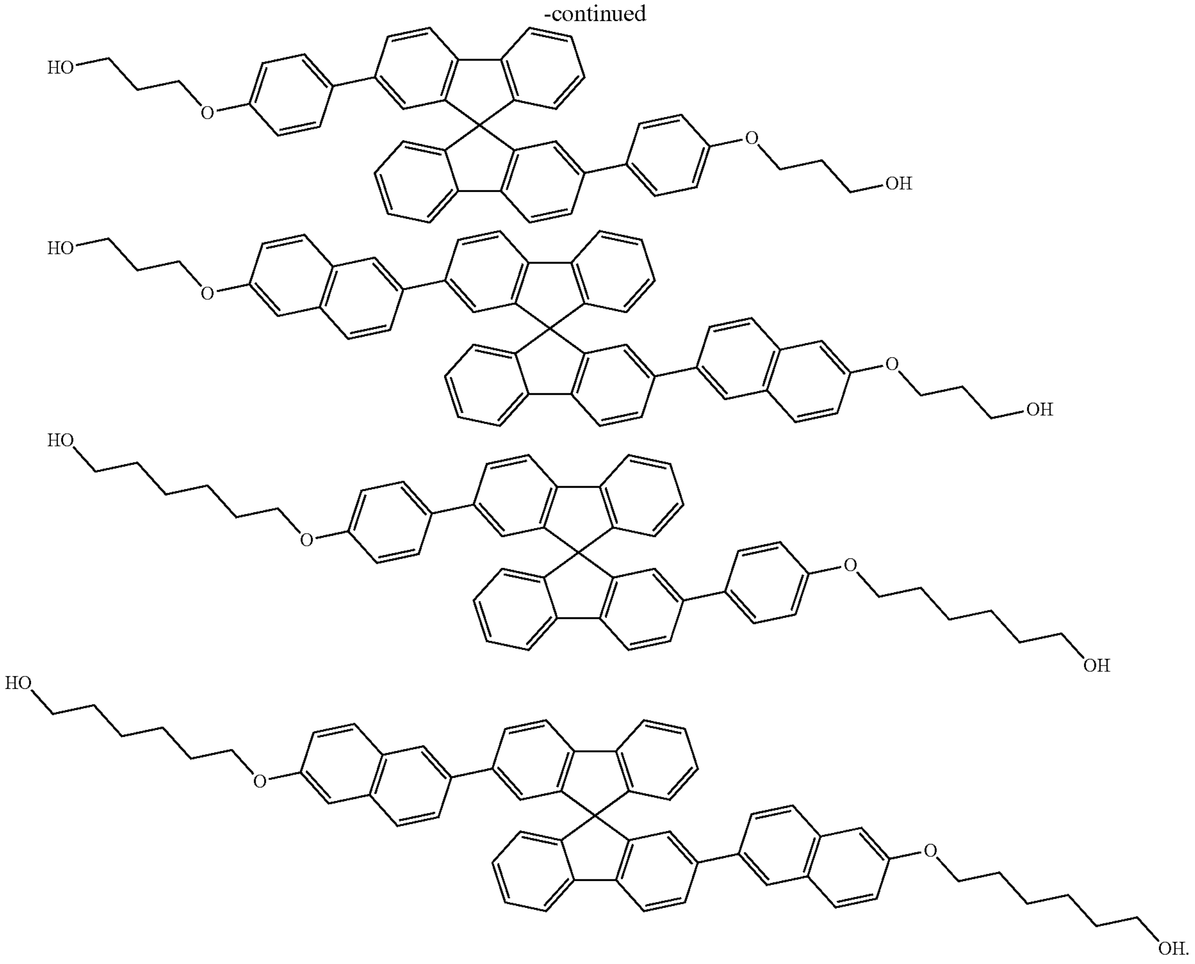

In an exemplary embodiment of the present invention, the compound represented by Chemical Formula 1a may be included in an amount of 1 part by weight to 99 parts by weight with respect to 100 parts by weight of the composition for preparing a resin.

The compound represented by Chemical Formula 1a may be included in an amount of preferably 1 to 60 parts by weight, 1 to 50 parts by weight, 1 to 40 parts by weight, 1 to 30 parts by weight or 1 to 20 parts by weight with respect to 100 parts by weight of the composition for preparing a resin.

In an exemplary embodiment of the present invention, the polyester precursor or the polycarbonate precursor may be included in an amount of 1 part by weight to 20 parts by weight with respect to 100 parts by weight of the composition for preparing a resin.

The polyester precursor or the polycarbonate precursor may be included in an amount of preferably 1 to 18 parts by weight, 1 to 16 parts by weight, 1 to 14 parts by weight, 1 to 12 parts by weight or 1 to 10 parts by weight with respect to 100 parts by weight of the composition for preparing a resin.

The compound represented by Chemical Formula 1a may be prepared by the following Reaction Scheme.

[Reaction Scheme]

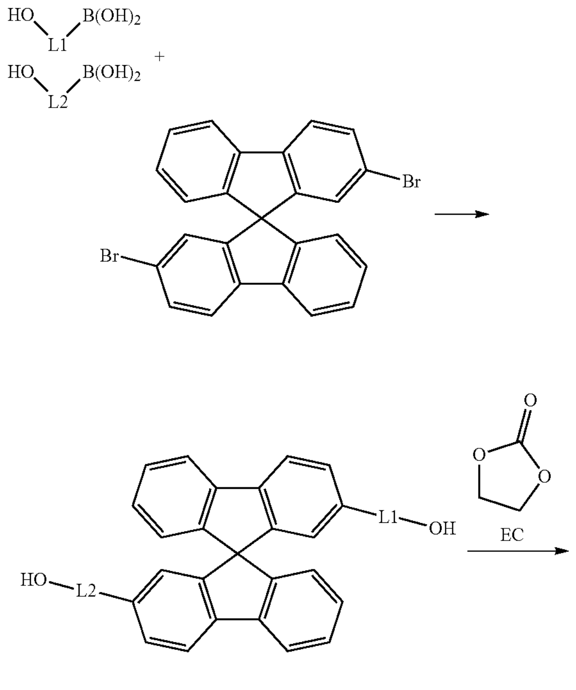

-continued

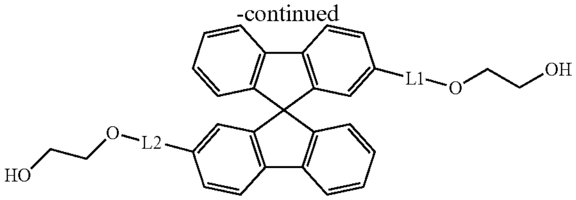

In the Reaction Scheme, the definition of the substituent is the same as the definition in the above-described Chemical Formula 1a.

Although the Reaction Scheme exemplifies a process of synthesizing a compound in which a specific substituent is bonded to a specific position, a unit corresponding to the range of Chemical Formula 1a may be synthesized by a synthesis method known in the art using a starting material, an intermediate material, and the like known in the art.

According to an exemplary embodiment of the present invention, the polyester precursor may be represented by the following Chemical Formula A, and the polycarbonate precursor may be represented by the following Chemical Formula B.

[Chemical Formula A]

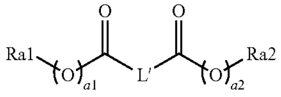

[Chemical Formula B]

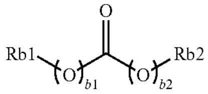

In Chemical Formulae A and B,

Ra1, Ra2, Rb1, and Rb2 are the same as or different from each other, and are each independently a substituted or unsubstituted alkyl group; or a substituted or unsubstituted aryl group, L' is a substituted or unsubstituted arylene group, and a1, a2, b1 and b2 are each 0 or 1.

In an exemplary embodiment of the present invention, Ra1, Ra2, Rb1, and Rb2 are the same as or different from each other, and are each independently a substituted or unsubstituted alkyl group having 1 to 30 carbon atoms; or a substituted or unsubstituted aryl group having 6 to 30 carbon atoms.

In an exemplary embodiment of the present invention, Ra1, Ra2, Rb1 and Rb2 are the same as or different from each other, and are each independently a substituted or unsubstituted alkyl group having 1 to 20 carbon atoms; or a substituted or unsubstituted aryl group having 6 to 20 carbon atoms.

In an exemplary embodiment of the present invention, Ra1, Ra2, Rb1 and Rb2 are the same as or different from each other, and are each independently a substituted or unsubstituted alkyl group having 1 to 10 carbon atoms; or a substituted or unsubstituted aryl group having 6 to 12 carbon atoms.

In an exemplary embodiment of the present invention, Ra1, Ra2, Rb1 and Rb2 are the same as or different from each other, and are each independently a substituted or unsubstituted methyl group; a substituted or unsubstituted ethyl group; or a substituted or unsubstituted phenyl group.

In an exemplary embodiment of the present invention, Ra1, Ra2, Rb1 and Rb2 are the same as or different from each other, and are each independently a methyl group; an ethyl group which is substituted with a hydroxyl group; or a phenyl group.

In an exemplary embodiment of the present invention, Ra1 and Ra2 are a methyl group.

In an exemplary embodiment of the present invention, Ra1 and Ra2 is an ethyl group which is substituted with a hydroxyl group.

In an exemplary embodiment of the present invention, Rb1 and Rb2 are a phenyl group.

In an exemplary embodiment of the present invention, L' is a substituted or unsubstituted arylene group having 6 to 30 carbon atoms.

In an exemplary embodiment of the present invention, L' is a substituted or unsubstituted arylene group having 6 to 20 carbon atoms.

In an exemplary embodiment of the present invention, L' is a substituted or unsubstituted arylene group having 6 to 12 carbon atoms.

In an exemplary embodiment of the present invention, L' is a substituted or unsubstituted phenylene group.

In an exemplary embodiment of the present invention, L' is a phenylene group.

In an exemplary embodiment of the present invention, a1 is 0.

In an exemplary embodiment of the present invention, a2 is 0.

In an exemplary embodiment of the present invention, b1 is 0.

In an exemplary embodiment of the present invention, b2 is 0.

In an exemplary embodiment of the present invention, a1 is 1.

In an exemplary embodiment of the present invention, a2 is 1.

In an exemplary embodiment of the present invention, b1 is 1.

In an exemplary embodiment of the present invention, b2 is 1.

The polycarbonate precursor serves to link an additional comonomer, if necessary, and other specific examples thereof which may be applied in addition to the compound represented by Chemical Formula B include phosgene, triphosgene, diphosgene, bromophosgene, dimethyl carbonate, diethyl carbonate, dibutyl carbonate, dicyclohexyl carbonate, ditolyl carbonate, bis(chlorophenyl) carbonate, m-cresyl carbonate, dinaphthyl carbonate, bis(diphenyl) carbonate, bishaloformate, or the like, and any one of them or a mixture of two or more thereof may be used.

The above-described unit of Chemical Formula 1 may be formed by polymerizing the compound represented by Chemical Formula 1a with the polyester precursor of Chemical Formula A or the polycarbonate precursor of Chemical Formula B.

In an exemplary embodiment of the present invention, it is preferred that the resin is polymerized from the compound represented by Chemical Formula 1a and the polyester precursor of Chemical Formula A.

The compound represented by Chemical Formula 1a may be used in an amount of 1 part by mol to 60 parts by mol with respect to 100 parts by mol of the entire monomer constituting the resin including the unit represented by Chemical Formula 1.

The polyester precursor represented by Chemical Formula A or the polycarbonate precursor represented by Chemical Formula B may be used in an amount of 50 parts by mol to 150 parts by mol with respect to 100 parts by mol of the entire monomer of the compound represented by Chemical Formula 1a, which constitutes the resin.

For the polymerization of the resin according to the present invention, methods known in the art may be used.

It is preferred that the polymerization is performed by a melt polycondensation method.

In the melt polycondensation method, a catalyst may be further applied as needed using the composition for preparing a resin, and melt polycondensation may be performed under heating and further under normal pressure or reduced pressure while removing by-products by an ester exchange reaction. As the catalyst, a material generally applied in the art may be adopted.

Specifically, in the melt polycondensation method, it is preferred that the compound represented by Chemical Formula 1a; and the polyester precursor or the polycarbonate precursor are melted in a reaction vessel, and then a reaction is performed in a state where a by-product compound is allowed to stay.

In order to allow the by-product compound to stay, pressure may be controlled by closing the reaction device, or reducing pressure or increasing pressure.

The reaction time of this process is 20 minutes or more and 600 minutes or less, preferably 40 minutes or more and 450 minutes or less, and more preferably 60 minutes or more and 300 minutes or less.

In this case, when the by-product compound is distilled off immediately after being produced, a resin to be finally obtained has a small content of high molecular weight materials. However, when the by-produced monohydroxy compound is allowed to stay in the reaction vessel for a certain period of time, the finally obtained resin is obtained to have a large content of high molecular weight materials.

The melt polycondensation method may be performed continuously or in a batch manner. The reactor used for performing the reaction may be a vertical type equipped with an anchor type impeller, a Maxblend impeller, a helical ribbon type impeller or the like, may be a horizontal type equipped with a paddle blade, a lattice blade, a spectacle-shaped blade or the like, and may be an extruder type equipped with a screw. In addition, it is desirable to use a reaction device that appropriately combines these reaction devices in consideration of the viscosity of the polymer.

In the method for preparing a resin used in the present invention, the catalyst may be removed or deactivated in order to maintain heat stability and hydrolysis stability after the completion of the polymerization reaction. A method of deactivating the catalyst by adding a known acidic material in the art may be preferably performed.

As the acidic material, for example, esters such as butyl benzoate, aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite, phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenylphosphine and bis(diphenylphosphino)ethane; boric acids such as boric acid and phenylboric acid; aromatic sulfonic acid salts such as dodecylbenzenesulfonic acid tetrabutylphosphonium salts; organic halides such as stearic acid chloride, benzoyl chloride and p-toluenesulfonic acid chloride; alkylsulfuric acids such as dimethylsulfuric acid; organic halides such as benzyl chloride, and the like are preferably used.

The acidic material may be used in an amount of 0.1 parts by mol to 5 parts by mol, preferably 0.1 parts by mol to 1 par by mol with respect to 100 parts by mol of the catalyst.

When the amount of the acidic material is smaller than 0.1 parts by mol, the deactivation effect becomes insufficient, which is not preferred. Further, when the amount exceeds 5 parts by mol, the heat resistance of the resin deteriorates and the molded article is easily colored, which is not preferred.

After the catalyst is deactivated, a process of devolatilizing a low boiling point compound in the resin may be further performed under a pressure of 0.1 mmHg to 1 mmHg and at a temperature of 200° C. to 350° C. In this process, a horizontal-type apparatus equipped with a stirring blade having excellent surface renewal ability such as a paddle blade, a lattice blade, and a spectacle-shaped blade, or a thin film evaporator is preferably used.

It is preferred that the content of foreign materials in the resin of the present invention is as small as possible, and filtration of a melting raw material filtration of a catalyst solution, and the like are preferably performed.

The mesh of the filter used in the filtration is preferably 5 μm or less, and more preferably 1 μm or less. In addition, filtration of the produced resin using a polymer filter is preferably performed. The mesh of the polymer filter is preferably 100 μm or less, and more preferably 30 μm or less. Furthermore, a process of obtaining a resin pellet needs to be performed in a low-dust environment, and the environment is preferably Class 6 or lower, and more preferably Class 5 or lower.

Further, examples of a method of molding a molded article including the resin include compression molding, molds, roll processing, extrusion molding, stretching, and the like in addition to injection molding, but are not limited thereto.

Another exemplary embodiment of the present invention provides a resin composition including the resin according to the above-described exemplary embodiments.

In an exemplary embodiment of the present invention, the resin may be included in an amount of 1 part by weight to 80 parts by weight based on 100 parts by weight of the resin composition.

In an exemplary embodiment of the present invention, the resin composition may further include a solvent. The solvent may be, for example, dimethylacetamide or 1,2-dichlorobenzene.

The solvent may be included in an amount of 20 parts by weight to 99 parts by weight based on 100 parts by weight of the resin composition.

The resin composition may further include an additional monomer in addition to the compound represented by Chemical Formula 1a. The additional monomer is not particularly limited, and a monomer generally applied in the art related to polyester or polycarbonate may be appropriately adopted as long as the main physical properties of the resin composition are not changed. The additional monomer may be used in an amount of 1 part by mol to 50 parts by mol with respect to 100 parts by mol of the entire monomer constituting the resin including the unit represented by Chemical Formula 1.

The resin composition may further include one or more selected from the group consisting of an additive, for example, an antioxidant, a plasticizer, an anti-static agent, a nucleating agent, a flame retardant, a lubricant, an impact modifier, a fluorescent brightener, a UV absorber, a pigment and a dye, if necessary, in addition to a resin including the unit represented by Chemical Formula 1.

The additive may be included in an amount of 1 part by weight to 99 parts by weight based on 100 parts by weight of the resin composition.

The type of antioxidant, plasticizer, anti-static agent, nucleating agent, flame retardant, lubricant, impact modifier, fluorescent brightener, UV absorber, pigment or dye is not particularly limited, and those applied in the art may be appropriately adopted. Still another exemplary embodiment of the present invention provides a molded article including the resin composition according to the above-described exemplary embodiments.

In an exemplary embodiment of the present invention, the molded article may be prepared from the resin composition or a cured product thereof.

As an example of a method of preparing the molded article, it is possible to include mixing the resin and the additive well using a mixer, preparing the resulting mixture as a pellet by extrusion molding the mixture using an extruder, drying the pellet, and then injecting the pellet using an injection molder.

In an exemplary embodiment of the present invention, the molded article is an optical lens.

The optical lens is manufactured by using the resin, has a high refractive index and high transparency, and may be preferably applied to a camera.

In the case of camera modules in the art, a desired performance is adjusted through three or more or four or more lenses. Currently, in the case of optical lenses, particularly mobile camera modules, the first requirement is to reduce the thickness by molding the lens or using a high refractive index resin, and the present invention is focused on a resin having a high refractive index capable of satisfying such requirements. A lens combination in consideration of an ideal lens thickness and the molding difficulty of a molded article facilitates the use of a material having a high refractive index.

MODE FOR INVENTION

Hereinafter, the present invention will be exemplified in more detail through Examples.

EXAMPLES AND COMPARATIVE EXAMPLES

1. Synthesis of Monomer 1

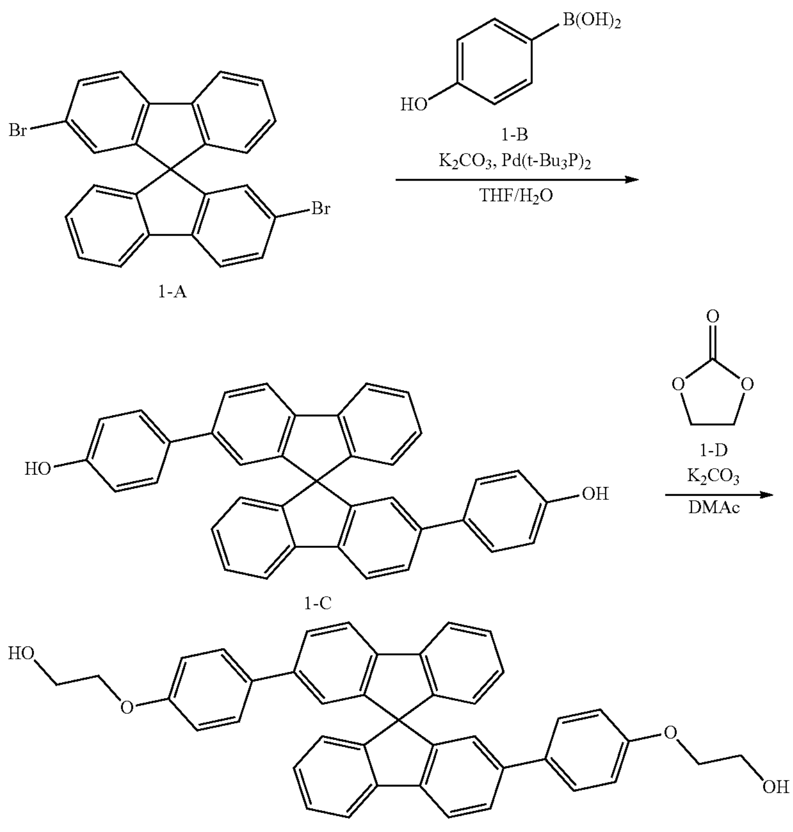

Monomer 1

1) Synthesis of Compound 1-C 47.4 g (100 mmol, 1.0 eq) of Compound 1-A and 34.5 g (250 mmol, 2.5 eq) of Compound 1-B were dissolved in 280 g of tetrahydrofuran (THF), and the resulting solution was stirred in an oil bath at 80° C. for 30 minutes. After 55.2 g (400 mmol, 4.0 eq) of $K_2CO_3$ was dissolved in 300 mL of water, the solution was added dropwise thereto for 10 minutes while maintaining the internal temperature of the solution at 50° C. or higher. 1.53 g (3 mmol, 0.03 eq) of a $Pd(t\text{-}Bu_3P)_2$ catalyst was added thereto at an internal temperature of 60° C. After being stirred for 1 hour, the mixture was washed with ethyl acetate (EA)/$H_2O$ to separate the organic layer, and the solvent was concentrated in vacuum. After purification by column chromatography through n-hexane (n-Hex) and dichloromethane (DCM), the resulting product was precipitated in n-hexane (n-Hex) to obtain Compound 1-C as a solid.

2) Synthesis of Monomer 1

50.0 g (100 mmol, 1.0 eq) of Compound 1-C, 22.0 g (250 mmol, 2.5 eq) of Compound 1-D, and 2.77 g (20 mmol, 0.20 eq) of $K_2CO_3$ were dissolved in 250 g of dimethylacetamide (DMAc), and the resulting solution was stirred in an oil bath at 120° C. for 2 hours. After cooling, a solid was precipitated by adding water thereto, and then filtered. The obtained solid was purified by column chromatography through ethyl acetate (EA) and dichloromethane (DCM), and then precipitated in n-hexane (n-Hex) to obtain 46.3 g of Monomer 1 as a white solid.

MS: $[M+H]^+$=588

2. Synthesis of Monomer 2

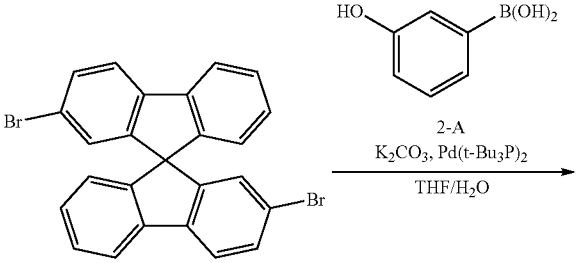

1-A

-continued

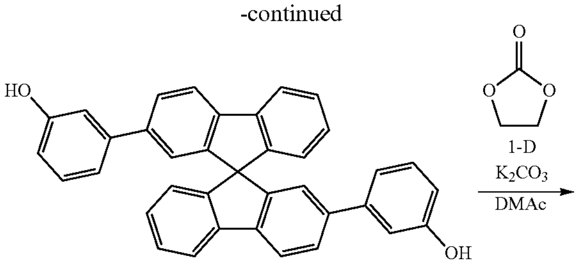

2-B

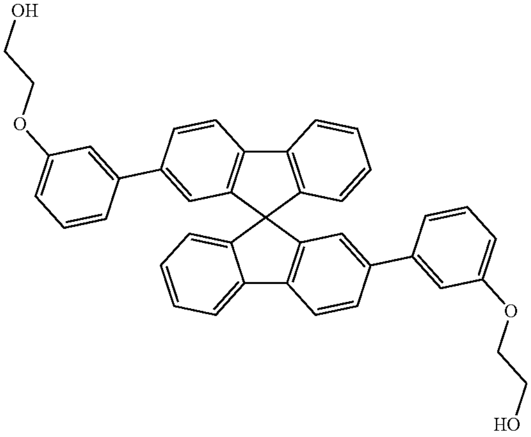

Monomer 2

Monomer 2 was obtained in the same manner as in the synthesis of Monomer 1, except that Compound 2-A was used instead of Compound 1-B.

MS: $[M+H]^+$=588

3. Synthesis of Monomer 3

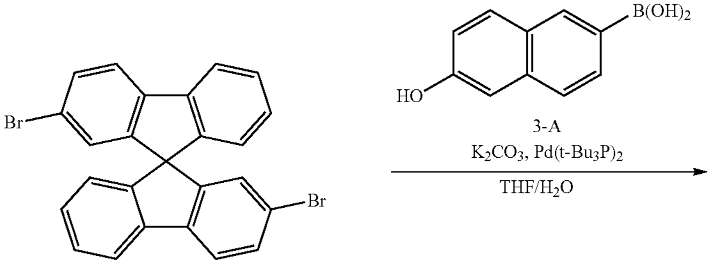

1-A

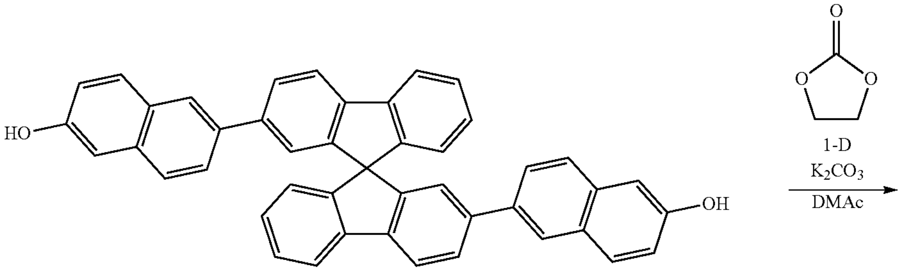

3-B

-continued
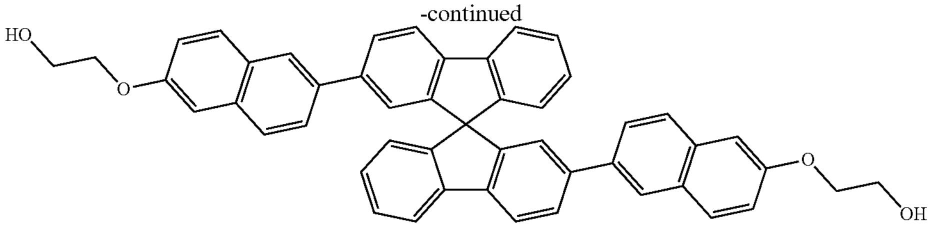
Monomer 3
Monomer 3 was obtained in the same manner as in the synthesis of Monomer 1, except that Compound 3-A was used instead of Compound 1-B.
MS: $[M+H]^+=688$
4. Synthesis of Monomer 4
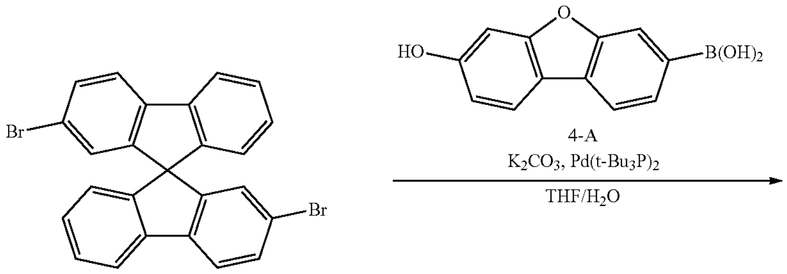
1-A
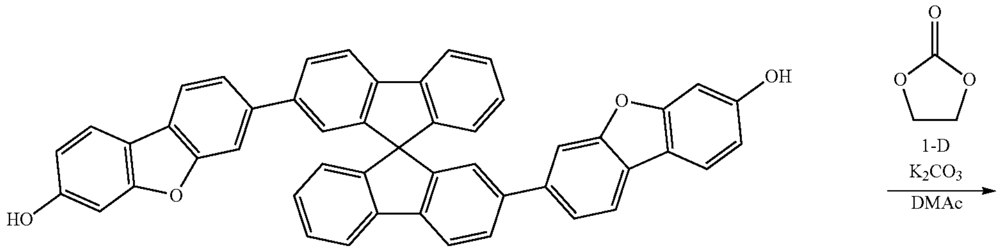
4-B
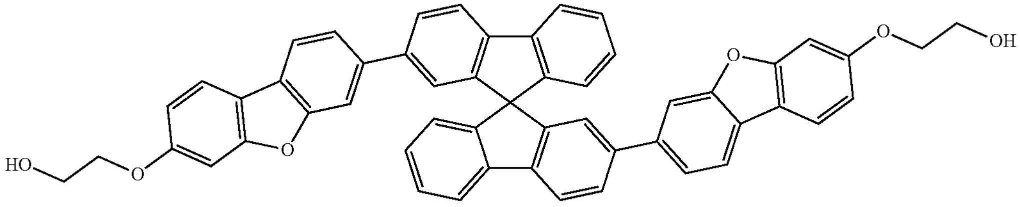
Monomer 4

Monomer 4 was obtained in the same manner as in the synthesis of Monomer 1, except that Compound 4-A was used instead of Compound 1-B.

MS: $[M+H]^+$=768

5. Synthesis of Monomer 5

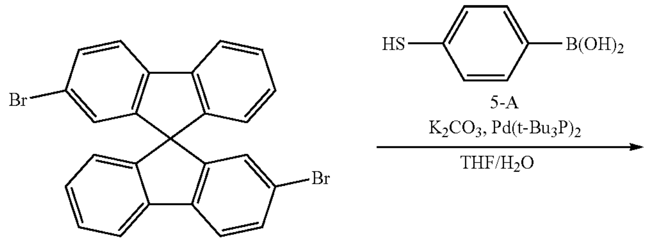

1-A

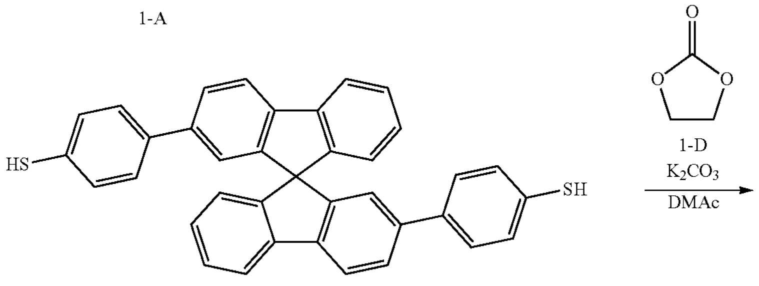

5-B

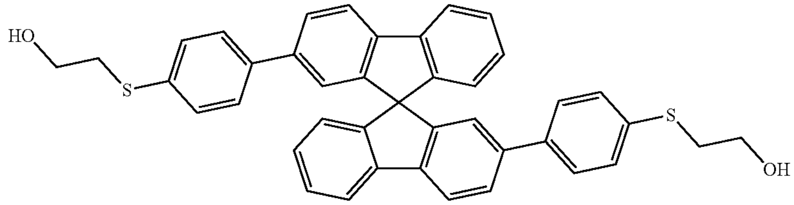

Monomer 5

Monomer 5 was obtained in the same manner as in the synthesis of Monomer 1, except that Compound 5-A was used instead of Compound 1-B.

MS: $[M+H]^+$=768

Synthesis of Comparative Example C1

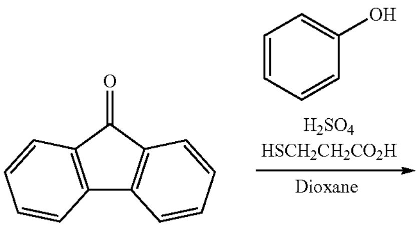

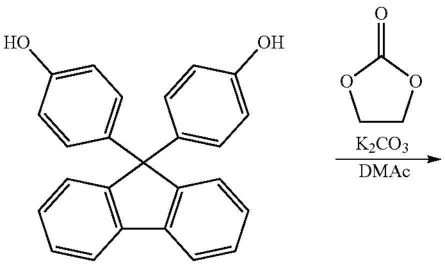

-continued

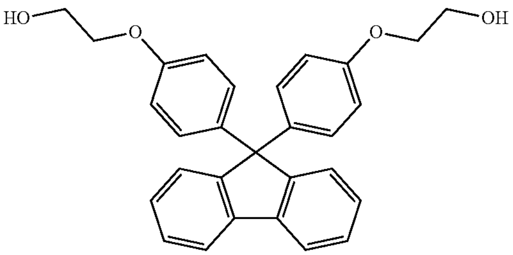

C1

Comparative Example C1 was obtained in the same manner as in the synthesis of Monomer 1, except that 9-fluorenone was used instead of Compound 1-A and phenol was used instead of compound 1-B. C1 may also be purchased from TCI or Sigma-Aldrich.

MS: $[M+H]^+$=438

Preparation of Resin (Polymer) 1

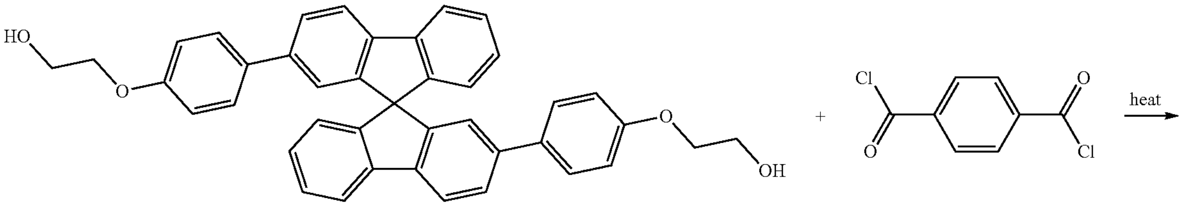

monomer 1

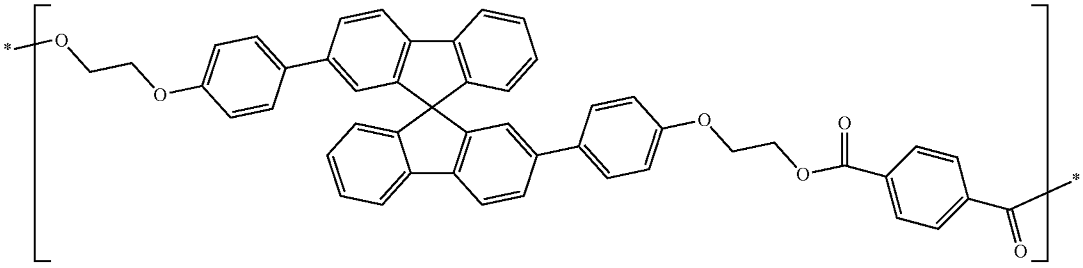

Polymer 1

1 g (1.70 mmol, 1.0 eq) of Monomer 1 and 0.35 g (1.77 mmol, 1.0 eq) of terephthaloyl chloride were dissolved in 4.1 g of diphenyl ether (DPE), and the resulting solution was reacted in an oil bath at 180° C. for 6 hours. Chloric acid (HCl) gas was generated as the reaction proceeded, and a nitrogen substitution device and a chloric acid gas capturing device were installed to remove the gas. After the reaction, the resulting product was cooled to 100° C., 15 g of dimethylacetamide (DMAc) was added thereto, and the resulting mixture was precipitated through methanol (methylalcohol) to prepare Resin (Polymer) 1.

Preparation of Resins 2 to 5

Resins 2 to 5 were prepared in the same manner as in the method of preparing Resin 1, except that Monomers 2 to 5 were used instead of Monomer 1.

Preparation of Comparative Example Resin P1

Comparative Example Resin P1 was prepared in the same manner as in the method of preparing Resin 1, except that a monomer of Comparative Example C1 was used instead of Monomer 1.

Preparation of Resin (Polymer) 6

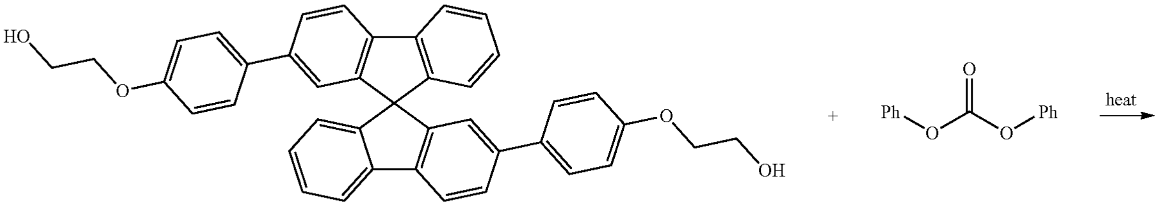

monomer 1

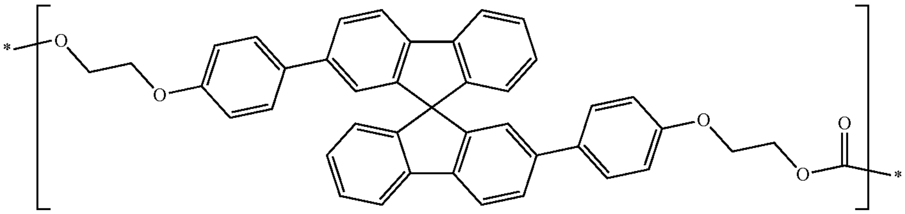

Polymer 6

57.7 g (98 mmol) of Monomer 1 and 21.4 g (100 mmol) of diphenylcarbonate were melted and reacted at 250° C. for 5 hours. As the reaction proceeded, phenol was generated as a by-product, and the degree of decompression was adjusted up to 1 Torr to remove the phenol. After completion of the reaction, the molten resin of a polymer polymerized by flowing nitrogen into the reactor to create a normal pressure atmosphere was taken out, whereby Resin (Polymer) 6 was obtained.

Preparation of Resins 7 to 10

Resins 7 to 10 were prepared in the same manner as in the method of preparing Resin 6, except that Monomers 2 to 5 were used instead of Monomer 1.

Preparation of Comparative Example Resin P2

Comparative Example Resin P2 was prepared in the same manner as in the method of preparing Resin 6, except that a monomer of Comparative Example C1 was used instead of Monomer 1.

Experimental Example

The molecular weight and molecular weight distribution of the polymerized resin sample were confirmed through gel permeation chromatography (GPC), and a thermogram was obtained using a differential scanning calorimeter (DSC) to investigate the thermal characteristics. After a film was formed to measure the refractive index and the Abbe's Number, a result value according to the wavelength of light was obtained using an ellipsometer.

For the molecular weight through gel permeation chromatography (GPC), results were obtained by injecting a solution produced using tetrahydrofuran (THF, stabilized with butylated hydroxytoluene (BHT)) as a solvent, dissolving the resin sample in tetrahydrofuran at a concentration of 1.0 mg/1 ml, filtering the dissolved resin sample with a syringe filter, and measuring the molecular weight at 40° C., and the results are shown in the following Table 1. A Waters RI detector was used, and two Agilent PLgel MIXED-B columns were used.

A differential scanning calorimeter (DSC) was measured to determine the glass transition temperature (Tg) of the resin. A glass transition temperature (Tg) was obtained on a graph obtained by heating a 5.5 mg to 8.5 mg of the resin sample to 270° C. under $N_2$ flow, cooling the resin sample, and then scanning the resin sample while heating the resin sample at a heating rate of 10° C./min during the second heating, and the glass transition temperature (Tg) is shown in the following Table 1.

In order to measure the refractive index and Abbe's Number of the resin, a polymer solution prepared by dissolving a resin powder sample obtained by polymerization in a solvent dimethylacetamide in an amount of 10 wt % based on the total weight of the polymer solution was applied onto a silicon wafer at a rotation speed of 220 rpm by spin coating to form a film having a thickness of 20 μm, and then the resulting values according to the wavelength of light were obtained at 20° C. using an ellipsometer, and are shown in the following Table 1. Specifically, the refractive index was measured at a wavelength of 589 nm, and for the Abbe's Number, an Abbe's Number was obtained by the following Equation by measuring the refractive index ($n_D$, $n_F$, and $n_C$) at a wavelength of D (589 nm), F (486 nm), and C (656 nm), respectively.

$$\text{Abbe's Number} = (n_D - 1)/(n_F - n_C)$$

TABLE 1

| | Resin | Mn (g/mol) | Mw (g/mol) | Tg (° C.) | Refractive index (589 nm) | Abbe' s Number |
|---|---|---|---|---|---|---|
| Example 1 | 1 | 12600 | 26400 | 212 | 1.691 | 14.2 |
| Example 2 | 2 | 12100 | 25900 | 208 | 1.698 | 14.0 |
| Example 3 | 3 | 11400 | 25500 | 236 | 1.721 | 13.1 |
| Example 4 | 4 | 13300 | 27100 | 235 | 1.705 | 13.4 |
| Example 5 | 5 | 12500 | 26400 | 211 | 1.699 | 13.9 |
| Example 6 | 6 | 13100 | 27100 | 211 | 1.689 | 14.3 |
| Example 7 | 7 | 11900 | 25700 | 203 | 1.694 | 14.1 |
| Example 8 | 8 | 11400 | 25200 | 230 | 1.716 | 13.3 |
| Example 9 | 9 | 15500 | 28100 | 238 | 1.705 | 13.4 |
| Example 10 | 10 | 12300 | 26300 | 208 | 1.689 | 14.0 |
| Comparative Example 1 | P1 | 16100 | 26100 | 151 | 1.659 | 21.4 |
| Comparative Example 2 | P2 | 16300 | 26200 | 149 | 1.655 | 21.4 |

In Table 1, Mn means the number average molecular weight, Mw means the weight average molecular weight, and the refractive index is a value measured at a wavelength of 589 nm.

According to Table 1, the resin according to the exemplary embodiment of the present invention includes the unit represented by Chemical Formula 1, and in particular, when L1 and L2 of a spirobifluorene core structure is substituted with an aromatic substituent rich in electrons such as an arylene group or a heteroarylene group, the refractive index may be improved by increasing the electron density of the spirobifluorene core structure.

Further, it can be confirmed that the resins of the Examples have a higher glass transition temperature (Tg) than the resins of the Comparative examples and thus have excellent heat resistance. In contrast, it can be confirmed that the resins according to Comparative Examples 1 and 2 do not have a substituent rich in electrons in a benzene ring of a fluorene core structure, and thus have very low refractive indices compared to the Examples of the present invention.

Currently, in the case of optical lenses, particularly mobile camera modules, the first requirement is to reduce the thickness by molding the lens or using a high refractive index resin. It could be confirmed that the resin according to an exemplary embodiment of the present specification is a highly utilized resin as an optical material because Examples 1 to 10 have a refractive index capable of satisfying the above requirement rather than Comparative Examples 1 to 2.

The invention claimed is:

1. A resin comprising a unit represented by Chemical Formula 1:

[Chemical Formula 1]

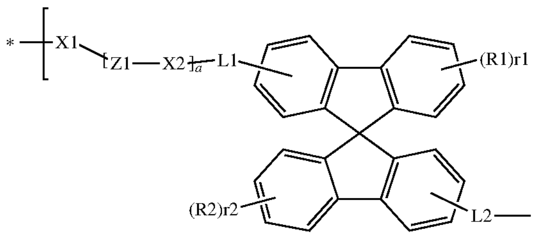

-continued

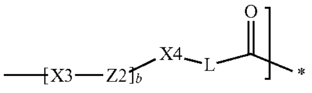

in Chemical Formula 1,

R1 and R2 are the same as or different from each other, and are each independently a substituted or unsubstituted alkyl group, or a substituted or unsubstituted cycloalkyl group;

r1 is an integer from 0 to 4, and when r1 is 2 or higher, each R1 is the same as or different from each other;

r2 is an integer from 0 to 4, and when r2 is 2 or higher, each R2 is the same as or different from each other;

L1 and L2 are the same as or different from each other, and are each independently a substituted or unsubstituted arylene group, or a substituted or unsubstituted heteroarylene group;

L is a direct bond, or —CO-L';

L' is a substituted or unsubstituted arylene group;

X1 to X4 are the same as or different from each other, and are each independently O or S;

Z1 and Z2 are the same as or different from each other, and are each independently a substituted or unsubstituted alkylene group, or a substituted or unsubstituted cycloalkylene group;

a and b are the same as or different from each other, and are each independently an integer from 1 to 10, and when a and b are each 2 or higher, each of Z1-X2 and X3-Z2 is the same as or different from each other; and

* means a moiety linked to main chain of the resin.

2. The resin of claim 1, wherein r1 and r2 are an integer of 0.

3. The resin of claim 1, wherein L1 and L2 are the same as or different from each other, and are each independently a substituted or unsubstituted arylene group having 6 to 20 carbon atoms, or a substituted or unsubstituted heteroarylene group having 4 to 20 carbon atoms.

4. The resin of claim 1, wherein Z1 and Z2 are the same as or different from each other, and are each independently a substituted or unsubstituted ethylene group.

5. The resin of claim 1, wherein X1 to X4 are O.

6. The resin of claim 1, wherein the resin has a weight average molecular weight of 10,000 g/mol to 200,000 g/mol.

7. The resin of claim 1, wherein the resin has a glass transition temperature (Tg) of 200° C. to 250° C.

8. The resin of claim 1, wherein the resin has a refractive index of 1.68 to 1.75, which is measured at a wavelength of 589 nm.

9. A method for preparing a resin of claim 1, the method comprising polymerizing a composition comprising a compound represented by Chemical Formula 1a; and a polyester precursor or a polycarbonate precursor:

[Chemical Formula 1a]

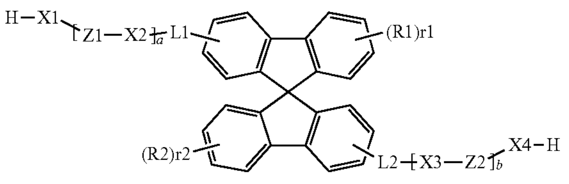

in Chemical Formula 1a, R1, R2, r1, r2, L1, L2, X1 to X4, Z1, Z2, a and b are defined as in Chemical Formula 1.

10. The method of claim 9, wherein the polyester precursor is represented by Chemical Formula A, and the polycarbonate precursor is represented by Chemical Formula B:

[Chemical Formula A]

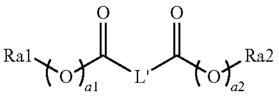

[Chemical Formula B]

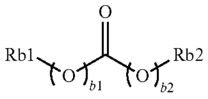

in Chemical Formulae A and B,

Ra1, Ra2, Rb1, and Rb2 are the same as or different from each other, and are each independently a substituted or unsubstituted alkyl group, or a substituted or unsubstituted aryl group;

L' is a substituted or unsubstituted arylene group; and a1, a2, b1 and b2 are each 0 or 1.

11. A resin composition comprising the resin of claim 1.

12. A molded article comprising the resin composition of claim 11.

13. The molded article of claim 12, wherein the molded article is an optical lens.

14. The resin of claim 1, wherein L1 and L2 are the same as or different from each other, and are each independently a substituted or unsubstituted phenylene group, a substituted or unsubstituted biphenylylene group, a substituted or unsubstituted naphthylene group, a substituted or unsubstituted divalent dibenzofuran group, a substituted or unsubstituted divalent fluorene group, or a substituted or unsubstituted divalent thiophenyl group;

L' is a substituted or unsubstituted phenylene group; and

Z1 and Z2 are the same as or different from each other, and are each independently a substituted or unsubstituted alkylene group having 1 to 10 carbon atoms.

15. The resin of claim 1, wherein the resin has —OH, —SH, —CO2CH3, or —OC6H5 as an end group.

16. The resin of claim 1, wherein the unit represented by Chemical Formula 1 is represented by Chemical Formula 1-1:

[Chemical Formula 1-1]

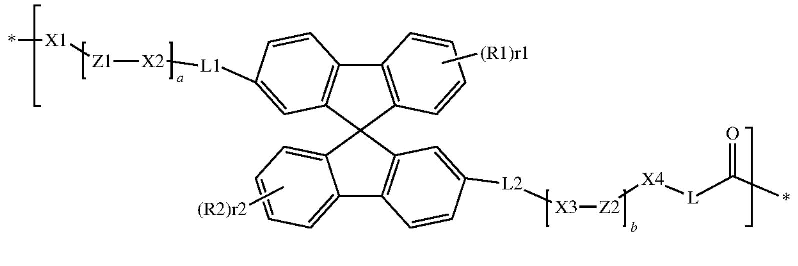

in Chemical Formula 1-1, R1, R2, r1, r2, L1, L2, L, X1 to X4, Z1, Z2, a, b and * are defined as in Chemical Formula 1.

17. The resin of claim 1, wherein the resin has an Abbe's number of 10 to 20 according to the following equation:

$$\text{Abbe's Number} = (n_D - 1)/(n_F - n_C)$$

wherein $n_D$, $n_F$, and $n_C$ are a refractive index at a wavelength of D (589 nm), F (486 nm), and C (656 nm), respectively at 20° C.

18. The method of claim 9, wherein the polyester precursor or the polycarbonate precursor is included in an amount of 1 part by weight to 20 parts by weight with respect to 100 parts by weight of the composition.

* * * * *